June 27, 1939.  K. H. POND  2,163,853
LOCK CONSTRUCTION
Filed Feb. 9, 1939  2 Sheets-Sheet 1
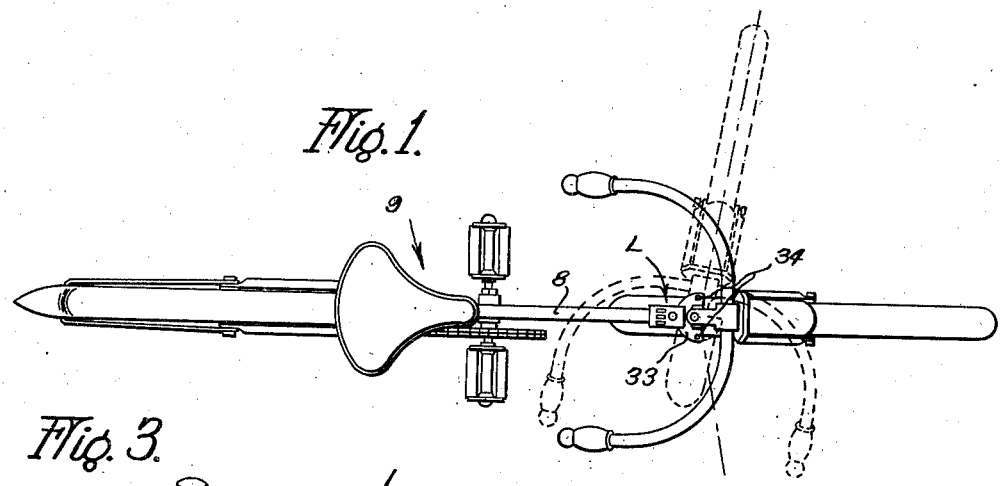
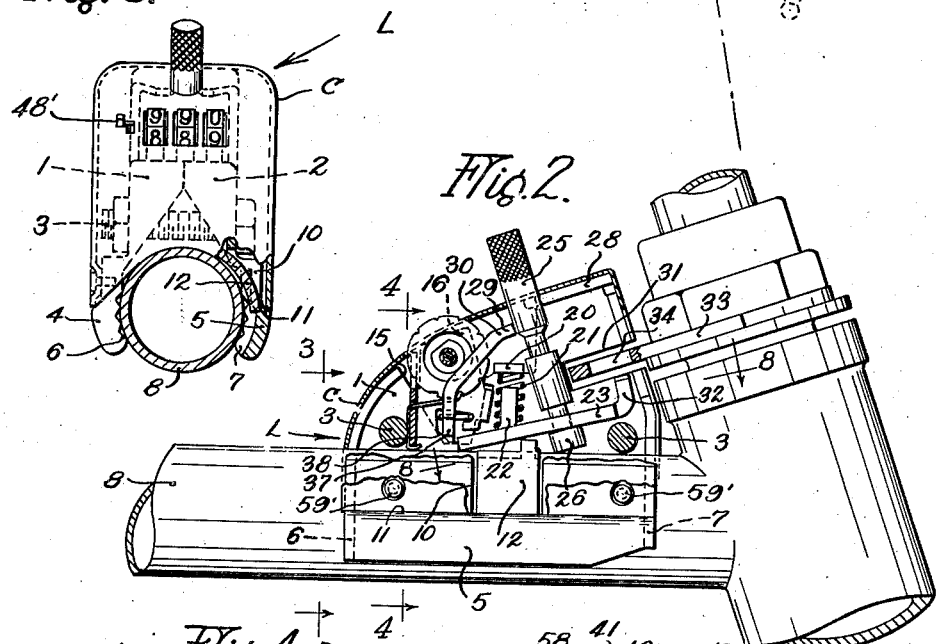
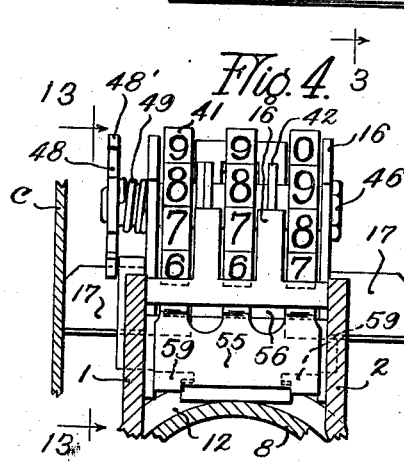
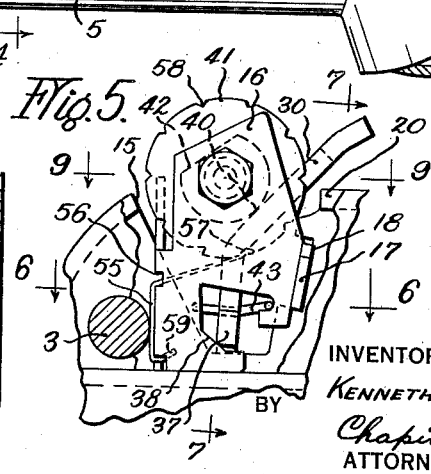
INVENTOR
KENNETH H. POND
BY Chapin + Neal
ATTORNEYS June 27, 1939.  K. H. POND  2,163,853
LOCK CONSTRUCTION
Filed Feb. 9, 1939   2 Sheets-Sheet 2

INVENTOR
KENNETH H. POND
BY Chapin + Neal
ATTORNEYS

Patented June 27, 1939

2,163,853

UNITED STATES PATENT OFFICE 2,163,853

LOCK CONSTRUCTION

Kenneth H. Pond, Longmeadow, Mass., assignor to Bemis and Call Company, Springfield, Mass., a corporation of Massachusetts Application February 9, 1939, Serial No. 255,377

9 Claims. (Cl. 70—185)

This invention relates to an improved lock construction and has particular reference to permutation locks in which the mechanism is moved to its locked position by means of a knob or latch post extending from the casing of the lock. In its broadest aspect, my conception consists in so arranging and constructing the various locking elements that in the locked position the parts not only perform the locking function but also are so related that any attempt to "force" the lock by pressure on the latch post or knob to force it towards the unlocked position, serves to lock the elements more tightly.

For convenience I have shown in the accompanying drawings how my invention may be used in a bicycle lock construction. It is, however, to be understood that this represents but one embodiment of my invention, and I do not intend to necessarily limit myself to this particular application except with regard to one or more specific claims, the applicability of the invention broadly in other fields being readily apparent to those skilled in the art when its principles are understood.

The means used to accomplish my idea along with its inherent advantages can best be understood by reference to the specification read in conjunction with the accompanying drawings in which, Fig. 1 is a top plan view of a bicycle equipped with a lock embodying the invention;

Fig. 2 is an enlarged sectional elevation of the lock of Fig. 1;

Fig. 3 is an end elevation of the lock on line 3—3 of Fig. 2, with certain parts broken away for clearness;

Fig. 4 is a sectional elevation on line 4—4 of Fig. 2;

Fig. 5 is a side view of the parts of Fig. 4;

Figure 6:
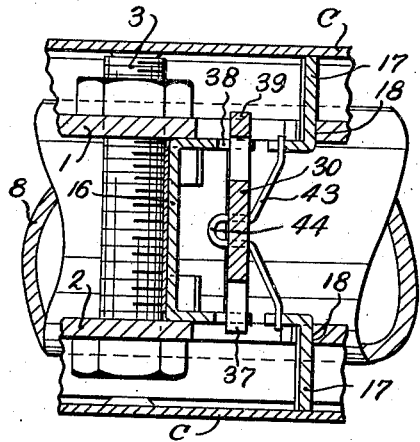
Fig. 6 is a sectional view on line 6—6 of Fig. 5.

Referring to Figs. 1 to 3 and 8, the body of the lock L consists of two complementary halves 1 and 2 contained within cover C and secured together by bolts 3. These body members 1 and 2 have depending skirts 4 and 5 extending lengthwise of the body members, these skirts being arcuate in cross section and with inwardly directed serrations 6 and 7 at each end. Serrations 6 and 7 form jaws which grip the top bar or frame tube 8 of a bicycle 9 when the bolts 3 are tightened. Substantially at the midpoint between bolts 3 are openings 10 cut in the walls of halves 1 and 2, with the openings terminating at the bottom at the ledge 11 on each body portion, see Figs. 2 and 3. A semi-circular saddle 12 abuts the bottom of each slot 10 and is welded or otherwise secured to the frame tube, see Figs. 2, 3, and 8. Thus when the bolts 3 are tightened to make the serrations 6 and 7 grip the tube 8 as previously explained, the halves tend to slip upwardly or "draw" until the slots abut the edges of the saddle 12 with the result that with the body halves drawn together in assembled relation the lock body is securely mounted on the frame tube. This particular method of attaching the body halves 1 and 2 to the frame tube 8 represents a simple and effective mounting. However, it is to be understood that other methods can be used that will prove as satisfactory, the one shown being merely by way of example.

Forward of the rear bolt 3, see Figs. 2 and 5, the body members 1 and 2 are each cut away as at 15 to receive the frame 16 of the permutation mechanism by which the lock is controlled. As the mechanism itself will be dealt with more in detail at a later point, it will suffice hereto say that the permutation mechanism is removable as a unit, the frame 16 of the mechanism being generally U-shaped with a pair of ears 17 at the forward end, see Figs. 5 and 6, which extend laterally and lie in notches 18 in each member 1 and 2. As is clear from the drawings, the frame 16 is held forward in the notches by the rear bolt 3.

Figure 8:
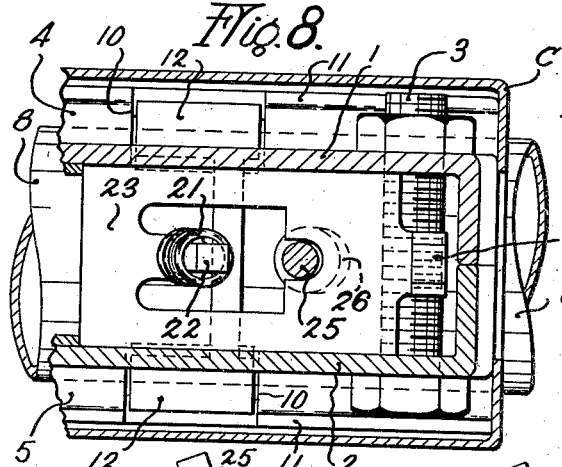
Fig. 8 is a view on line 8—8 of Fig. 2.

Adjacent and slightly above the notches 18 the members 1 and 2 are formed with an inwardly directed lip 20 to provide an abutment for one end of a latch spring 21 which is threaded over an upstanding integral lug 22 on a latch 23, see Figs. 2 and 8. Latch 23 overlies the frame tube 8 between members 1 and 2, and finds a bearing against the lower forward edges of the frame 16 of the permutation mechanism. The latch is moved by a latch post 25 extending through an open ended slot in the latch 23 with an enlarged head 26 on the latch post 25 underlying the latch. The opposite end of the latch post 25 extends upwardly through a hole in cover C and bears against the inwardly directed lip 28 of each member 1 and 2 and the forward end 29 of bolt 30, the extreme end portion of the latch post being knurled to provide a grip, see Fig. 2. As is evident from the drawings, the spring 21, latch 23, latch post 25 and lip 28 are proportioned so that the parts are held in contact, with the head 26 of the latch post resting against tube 8 in the unlocked position of Fig. 2, this being a preferred arrangement to prevent rattling of the parts.

At the forward end each member 1 and 2 has a rectangular slot 31 cut in the side and front walls. This lot, see Fig. 2, is positioned above a toe 32 on the latch 23 and provides a passage way for a locking plate 33 mounted to turn with the front fork of the bicycle 9. As appears in Figs. 1 and 2, this locking plate 33 has holes 34 which are arranged to be in register with the toe 32 on latch 23 in certain angular positions of the fork. To use the lock the rider turns the fork until one of the holes 34 in plate 33 is in proper registration with the toe 32 on latch 23 and raises the latch post 25. As will be explained later in detail, the permutation mechanism is arranged to lock the latch post 25 in position when it has been raised sufficiently to cause the toe 32 to enter the hole 34, thereby effectively preventing turning of the fork.

Figure 7:
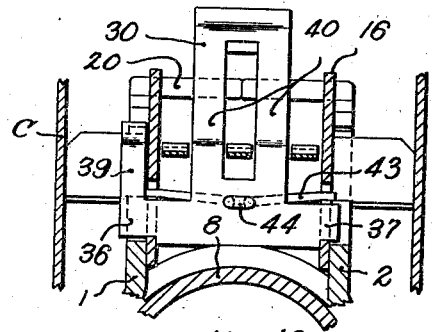
Fig. 7 is a view taken substantially on line 7—7 of Fig. 5, showing the bolt construction.

Referring now to Figs. 5 to 7, bolt 30 lies between the wings of the U-frame 16 and has nubs 36 and 37 which bear on the slanting surface 38 of an irregular shaped notch cut out of the material of each wing of the frame. Nub 36 is larger than nub 37 and extends beyond the frame wing to terminate in a generally upstanding arm 39 which in certain positions of the locking mechanism, as will be explained, serves to prevent changing of the prevailing combination of the permutation mechanism. Near the center, the bolt is shaped to provide two control surfaces 40 spaced to fit between the permutation wheels 41 of the permutation mechanism, and bear against the inner wheels 42 of said mechanism.

As is clear from Figs. 5 and 6, bolt 30 is constantly urged against the slanting surface 38 by a bolt spring 43 which spans the frame 16 and has its ends supported thereby, with a U-shaped loop 44 passing through a slot cut in the bolt 30.

Figure 9:
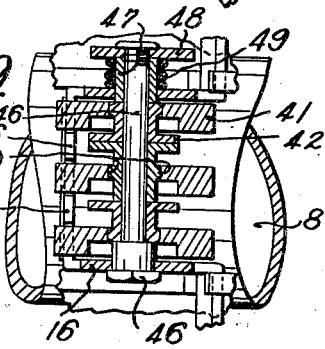
Fig. 9 is a section on line 9—9 of Fig. 5, showing details of the permutation mechanism.

The permutation mechanism is of a type well known in the art and will be dealt with only in a general way. In Fig. 9, the permutation wheels 41 are supported on the shanks of the inner wheels 42 which pass through openings in the permutation wheels and are themselves supported on shaft 46. The inner wheels 42 abut each other, the series being held between the enlarged head of the shaft 46 and a bushing 47. A finger piece 48 is threaded on the shaft 46 at the small end, which is riveted over as indicated. The shaft 46 is journaled in the wings of the frame 16, the shaft spring 49, threaded over the bushing 47 between the frame 16 and finger piece 48, serving to urge the assembly upward with the inner wheels in position to contact the control surfaces of the bolt 30, see also Fig. 4. The shanks on inner wheels 42 have a pair of nubs 50 struck up in position to enter complementary slots in the permutation wheels 41. By this arrangement, if the permutation wheels are turned, the rotation is imparted to the inner wheels.

Figures 10, 11, 13:
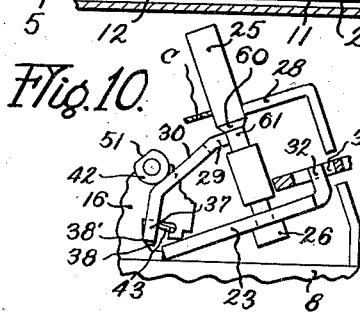
Figs. 10 to 12 are semi-diagrammatic views of the locking elements shown in Fig. 1 and illustrates the sequence of movements in the locking operation.
Fig. 13 is a view on line 13—13 of Fig. 4 showing the bolt in position to prevent a change in the opening combination to which the permutation wheels are set.
Figure 12:
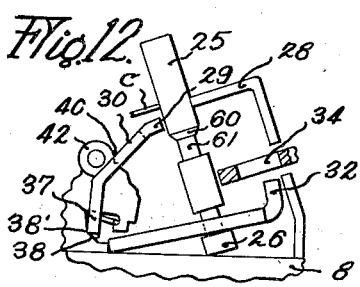
Figure 14:
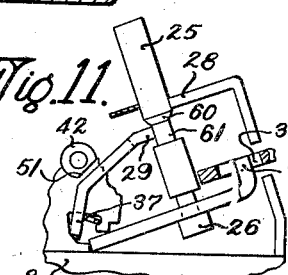
Fig. 14 is a view of the parts of Fig. 13 but with the bolt in position to allow a change in the opening combination.

Each inner wheel has a flattened portion 51, see Fig. 13, on its periphery, and as is customary, the bolt can operate to unlock the lock only when the flats on the various inner wheels are all parallel to the control surfaces of the bolt as in Fig. 14. This condition will exist only when the opening combination to which the lock is set has been set up on the permutation wheels.

Whereas there are only two nubs 50 in the shanks of the inner wheels 42, there are slots in wheels 41 corresponding in number and radial position to the number and position of the indicia on these wheels 41. It is evident therefore that the unlocking combination of the lock can be changed by engaging the nubs 50 of each inner wheel 42 with a different pair of slots in its permutation wheel. With the structure already described, it is a simple matter to move the series of inner wheels laterally to disengage nubs 50 from wheels 41 by pressure on the finger piece 48, the permutation wheels 41 being held in their lateral position by the edge of the frame 16 through which their peripheries extend, see Fig. 9. Then while the inner wheels are disengaged, the permutation wheels are moved to a new combination. As appears in Figs. 3 and 4, the finger piece 48 has a tail 48' which extends through an opening in the cover C adjacent the opening provided for the permutation wheels 41. As is frequently done with this type of construction, the opening for the tail 48' of finger piece 48 is arranged for convenience to hold the inner mechanism in its shifted position during the changing of the combination.

Referring to Figs. 4 and 5, a detent spring 55 lies against the back of the frame 16 between the frame 16 and bolt 3 and has a forwardly extending finger for each permutation wheel passing through a slot 56 in the frame with its end 57 arranged to fit a series of notches 58 cut in the periphery of each permutation wheel. The lower end of this spring has a pair of tabs 59 which are bent under the edge of the frame to secure it in position. As is well known in the art, the notches 58 are positioned so that with the ends 57 lying in the notches the various indicia are parallel as indicated in Fig. 3.

The locking mechanism previously described is supported in the body halves 1 and 2 and, as shown, the entire assembly contained within the cover C already referred to, see Fig. 1. This cover which is secured to the body halves 1 and 2 by screws 59' not only gives a finished appearance to the structure but prevents any tampering with the parts as only essential operating elements of the locking structure are exposed. As an aid in preventing unauthorized persons from removing the cover C, the screws 59' may be constructed as shown with heads formed as plain cylinders, that is, without eyes or squared heads. Then, a special tool for gripping the sides of the heads is necessary to remove the covers and this is usually unavailable to the layman.

I will now describe the complete locking cycle as shown in Figs. 2 and 10 to 12. With the parts arranged as indicated in Fig. 2, that is, with the permutation wheels off the unlocking combination and with the toe 32 on the latch disengaged from the hole 34 in the locking plate 33, the latch post is raised to a position slightly above that shown in Fig. 10, the toe 32 passing into the hole 34. The bolt spring pushes the nubs 36 and 37 to the top of slanting surface 38, the nubs coming to rest in the corner 38'. As the bolt moves up the surface 38 it slides on the inner wheels 42, the effect of the motion being to rotate the bolt slightly in a clockwise direction until its forward end 29 contacts the cylindrical surface 61 of latch post 25 below the chamfered portion 60. The latch post is then released and the parts come to rest as shown in Fig. 10, the latch post being held by the bolt 30. Any attempt to turn the fork of the bicycle and consequently the plate 33 fastened thereto is blocked by the interengagement of toe 32 and hole 34.

To unlock the mechanism, the permutation wheels are turned until the flats 51 are positioned as indicated in Fig. 11. Then the latch post 25 is raised slightly until the front edge 29 of the bolt can slip past the chamfered portion 60 and allow the bolt control surfaces to rest against the flats 51 of the inner wheels, with the edge 29 of the bolt entirely free of the latch post, this last position of the parts being that shown in Fig. 12. The latch post 25 is then released and the latch drops to the position in Fig. 2 with the toe 32 disengaged from the hole 34 in the locking plate 33 and the fork of the bicycle is free to turn.

To again prepare the permutation mechanism to lock the lock, the permutation wheels 41 are turned to another setting than the opening combination. During this operation the peripheries of the inner wheels 42 will press on the control surfaces 40 of the bolt 30 to first force the front edge 29 of the bolt against the upper shank of latch post 25 and then move the nubs 36 and 37 down the slanting bearing surface 38, compare Figs. 12 and 2, the latter figure being the final position assumed by the parts.

Referring now to Figs. 13 and 14, it will be recalled that it was stated earlier that the arm 39 on the bolt 30 functioned to prevent changing of the opening combination of the lock except in certain positions of the parts. In Fig. 13 the bolt 30 is shown in the position assumed by it when the lock is ready to be locked, that is in the position of Fig. 2, while in Fig. 14 the bolt is in the unlocking position shown diagrammatically by Fig. 12. As appears on the drawings, the finger piece 48 has a hook-shaped lower end behind which the upper end 65 of arm 39 lies except in the unlocking position of Fig. 14. When it is remembered that the finger piece 48 must be moved towards the frame 16 before the combination can be changed, it will be readily understood that the arm 39 allows changing of the opening combination only when the lock is unlocked. In this manner, no one but the one familiar with the opening combination can vary the same. This of course prevents another than the user from surreptitiously changing the combination, thereby rendering the lock useless to the true owner.

With the foregoing detailed description completed, I will now point out how this particular arrangement functions to lock the elements more tightly if pressure is exerted on the end of latch post 25. It will be observed from Figs. 2 and 10 to 14 that the nubs 36 and 37 bear on the slanting surface 38 of frame 16 only along one edge, that is, there is a knife edge bearing between the bolt 30 and frame 16. As the figures show, this bearing edge on the bolt 30 slides upward into the corner 38' when the mechanism is locked and stays in that position until forced down the slanting surface 38 when the permutation wheels are set off the unlocking combination and the elements positioned as in Fig. 2. While the lower edge of the bolt is located in the corner 38' the bolt is effectively pivoted whereas contact with the slanting surface 38 allows the lower edge of the bolt to slide. With the lock effective as in Fig. 10, the front end 29 of the bolt contacts the cylindrical surface 61 of the latch post below the chamfer 60 while the opposite end of the bolt is located in the corner 38'. Therefore, any attempt to force latch post 25 downwardly to disengage the toe 32 from hole 34 will rotate bolt 30 about the bearing in corner 38'. This rotation immediately causes the bolt to exert a pressure crosswise of the latch post 25 to wedge it tightly against the lip 28 of the body halves 1 and 2. The greater the force exerted on latch post 25 the greater the wedging action with the result that the latch post is locked more tightly and the force is increasingly less effective in rendering the lock ineffective. With the bolt 30 arranged at a substantial angle to the latch post 25 as indicated the wedging force of the bolt is sufficient to positively prevent forcing the lock without first fracturing the body halves 1 and 2 at the lip 28.

In addition to making it possible to have the force applied to the end of the latch post act to more tightly lock the parts together, this arrangement minimizes shear on the bolt. That is, the forces on the bolt are between the edge 29 and the knife edge bearing when the latch post is forced downward. The bolt therefore is better able to withstand the pressure and need not be as heavy to perform the function of preventing forcing of the lock as is the case where the instance the force is resisted by a lip or locking tongue, which engages a notch on the latch post or other part of the lock.

Recalling the detailed description of the locking cycle as shown by Figs. 2 and 10 to 12, it will be remembered that when the permutation wheels are set to another than the unlocking combination the latch post must be raised to render the lock effective. This particular arrangement adds a desirable safety factor to the lock for with the parts ready to lock as in Fig. 2, there is no danger that the jarring of the lock occasioned by riding the bicycle on rough roads will cause the toe 32 in the latch 23 to accidentally engage the hole in the locking plate 33. On the other hand, while the described association of parts is the preferred one, if Fig. 2 of the drawings is considered in an inverted position, the following is evident. Assuming that the plate 34 is fixed for rotation with the front fork as before but mounted below the frame tube, the end 26 of the latch post could be extended and then the lock would be locked by pressing the latch post downward. This feature is pointed out in order to make it clear that other ways of practicing my invention can easily be devised and that I therefore do not limit myself to the exact form shown.

Numerous other features are incorporated in my lock, one of the more apparent being the accessibility of the various parts in spite of their compact arrangement. For instance, by removing the cover C and the rear bolt 3, see Fig. 2, the permutation mechanism including the bolt, can be extracted as a unit and replaced by a new one. Also, with the permutation mechanism out, the rest of the lock, that is, the latch and its associated parts, is exposed and available for alteration. The complete structure partakes of the nature of an integral part of the bicycle and though of intricate mechanism is readily adaptable for its purpose because of the particular arrangement and operation of the parts.

I claim:

1. In a permutation lock, permutation members each provided with a lock-controlling element, a securing element having an effective position and an ineffective position, an operating handle for moving said securing element to said effective position, a locking element controlled by said lock-controlling elements, and adapted, when the prevailing combination of the permutation members is disturbed and the operating handle afterwards positioned to render said securing element effective, to lie at a substantial angle to the axis of motion of the handle with one end pivoted on a stationary lock member and the other end in position to engage the operating handle and prevent its motion toward the non-effective position of said securing element.

2. The structure of claim 1 with said pivot for said locking element consisting of a notch into which said pivoted end of said element slides when the operating handle is moved to the effective position of said securing element.

3. In a permutation lock, a frame, permutation members each provided with a lock-controlling element and mounted on said frame, a securing element having an effective position and an ineffective position, an operating handle for moving said securing element to said effective position, a locking element controlled by said lock-controlling elements and bearing at one end on said frame, said locking element being adapted when the prevailing combination of the permutation members is disturbed, and said operating handle afterwards positioned to render said securing element effective, to lie at a substantial angle to the axis of motion of the handle with one end pivoted on the frame and the other end in position to engage the operating handle and prevent its motion toward the non-effective position of said securing element.

4. In a permutation lock, a frame having a smooth bearing surface with a notch at one end, permutation members each provided with a lock-controlling element and mounted on said frame, a securing element having an effective position and an ineffective position, an operating handle for moving said securing element to said effective position, and a locking element controlled by said lock-controlling elements and having a knife edge bearing resting on said frame bearing surface, said locking element being adapted when the prevailing combination of the permutation member is disturbed and said operating handle afterwards positioned to render said securing element effective, to lie at a substantial angle to the axis of motion of the handle with the knife edge in the notch at the end of the smooth bearing surface and the other end of the lock-controlling member in position to engage the operating handle and prevent its motion toward the non-effective position of said securing element.

5. In a permutation lock, permutation members each provided with a lock-controlling element, a securing element having an effective and an ineffective position, an operating handle for moving said securing element to said effective position, a locking element controlled by said lock-controlling elements and adapted when the prevailing combination of the permutation members is disturbed and the operating handle afterwards positioned to render said securing element effective, to lie at a substantial angle to the axis of the handle with one end pivoted on a stationary lock member and the other end in position to engage the operating handle and prevent its motion toward the non-effective position of said securing element only.

6. In a permutation lock, permutation members each provided with a lock-controlling element, a locking element controlled by said lock-controlling elements, a securing element having an effective position and an ineffective position, an operating handle for moving said securing element to said effective position, and a pair of complementary body halves through an opening in which said operating handle passes, and within which said aforementioned elements are contained, said locking element being adapted when the prevailing combination of the permutation members is disturbed and the operating handle afterwards positioned to render said securing element effective, to lie at a substantial angle to the axis of motion of the handle with one end pivoted on a stationary lock member and the other end in position to engage the operating handle for the purpose stated.

7. In a lock for use with a bicycle, a securing element having at one end a toe, a plate fixed for rotation with the front fork and having holes therein to register with said toe in certain angular positions of the fork, an operating handle for moving said securing element to engage said toe with said holes, permutation members each provided with a lock-controlling element, a locking element controlled by said lock-controlling elements and adapted when the prevailing combination of the permutation members is disturbed and the operating handle afterwards positioned to engage said toe with said holes, to lie at a substantial angle to the axis of motion of the handle with one end pivoted on a stationary lock member and the other end in position to engage the operating handle and prevent its motion in a direction to disengage said toe from said holes.

8. The structure of claim 7, with said pivot for said locking element consisting of a notch into which said pivoted end of said element slides when the operating handle is moved to engage the toe on the securing element with the holes in the plate.

9. In a lock for use with a bicycle, a securing element having at one end a toe, a plate fixed for rotation with the front fork and having holes therein to register with said toe in certain angular positions of the fork, an operating handle for moving said securing element to engage said toe with said holes, permutation members each provided with a lock-controlling element, a locking element controlled by said lock-controlling elements, and a pair of complementary body halves for said lock through an opening in which said operating handle passes, said locking element being adapted when the prevailing combination of the permutation members is disturbed and the operating handle afterwards positioned to engage said toe with said holes, to lie at a substantial angle to the axis of motion of the handle with one end pivoted on a stationary lock member and the other end in position to engage the operating handle for the purpose stated.

KENNETH H. POND.